(12) United States Patent
Goor

(10) Patent No.: US 6,305,009 B1
(45) Date of Patent: Oct. 16, 2001

(54) COMPILER DESIGN USING OBJECT TECHNOLOGY WITH CROSS PLATFORM CAPABILITY

(76) Inventor: Robert M. Goor, 876 Madison St., Birmingham, MI (US) 48009-5678

( * ) Notice: Subject to any disclaimer, the term of this patent is extended or adjusted under 35 U.S.C. 154(b) by 0 days.

(21) Appl. No.: 09/204,583

(22) Filed: Dec. 3, 1998

Related U.S. Application Data

(60) Provisional application No. 60/067,827, filed on Dec. 5, 1997.

(51) Int. Cl.$^7$ .................................................. G06F 9/445
(52) U.S. Cl. ............................ 717/4; 717/3; 717/5; 717/9
(58) Field of Search ..................................... 717/4, 3, 5, 9

(56) References Cited

U.S. PATENT DOCUMENTS

| | | | | |
|---|---|---|---|---|
| 5,613,122 | * | 3/1997 | Burnard et al. ........................... | 713/1 |
| 5,652,884 | * | 7/1997 | Palevich .................................... | 713/1 |
| 5,953,524 | * | 9/1999 | Meng et al. .......................... | 395/701 |
| 6,195,774 | * | 2/2001 | Jacobson .............................. | 714/727 |

OTHER PUBLICATIONS

Temte, "A Compiler Construction Project for an Object–Oriented Language", ACM, pp. 138–141, Mar. 1992.*
Temte, "Let's Begin Introducing the Object–Oriented Paradigm", ACM, pp. 73–77, Mar. 1991.*
Hagimont et al., "Persistent Shared Object Support in the Guide System: Evaluation & Related Work", ACM, pp. 129–144, Oct. 1994.*
Wu et al., "An Object–Oriented Specification and its Generation for Compiler", ACM, pp. 323–330, Mar. 1992.*
Rogue Wave Software, "Tools.h++, Foundation Class Library for C++ Programming, User's Guide", Rogue Wave, Inc., Corvallis, Oregon, 1996, pp. 123–159.

Shepherd, George and Scot Wingo, "MFC Internals", Addison Wesley Developers Press, Reading, Massachusetts, 1996, pp. 162–174.

* cited by examiner

*Primary Examiner*—Mark R. Powell
*Assistant Examiner*—Ted T. Vo
(74) *Attorney, Agent, or Firm*—Reising, Ethington, Barnes, Kisselle, Learman & McCulloch, P.C.

(57) ABSTRACT

A programming language environment that includes an object compiler and associated object execution engine. The object compiler parses and converts source code into object-oriented, compiled code that is platform independent and that can be executed by the object execution engine at speeds close to that of a true compiled binary executable. The compiler parses the statements of source code and converts each statement into one or more pre-defined, persistent instruction objects. Then, it orders the instruction objects, generating a sequence of instruction objects that are stored as a platform-independent file. The instruction objects each have a virtual initialize method, a virtual execute method, and an index indicative of the next instruction object in the sequence. Data used in the statements can be represented as persistent data objects and the instruction objects and data objects can be stored in separate stacks (i.e., as linked lists), with their indices indicating their position within the stack. The memory address of each instruction object and data object is allocated dynamically at run time, with the initialize method being used to convert each index to a pointer that identifies the memory address of the next object in the stack. The execute method executes at least one machine language instruction and returns a pointer to the next instruction object. Thus, the object execution engine executes the sequence of instruction objects by calling the execute method of each instruction object and using the returned pointer to access the next instruction object.

15 Claims, 6 Drawing Sheets

Class Program

Public Methods:

virtual Compile ()
    virtual Initialize ()
    virtual Execute ()

Private Attributes:

Stack InstructionList    (objects of class Statement)
    Stack MemoryList    (objects of class LocalStorage)
    Stack RValueList    (objects of class Storage)
    Stack LValueList    (objects of class Storage)
    Stack MemoryNames
    Stack LValueNames
    Stack RValueNames

Class Program

Public Methods:

virtual Compile ()
    virtual Initialize ()
    virtual Execute ()

Private Attributes:

Stack InstructionList    (objects of class Statement)
    Stack MemoryList    (objects of class LocalStorage)
    Stack RValueList    (objects of class Storage)
    Stack LValueList    (objects of class Storage)
    Stack MemoryNames
    Stack LValueNames
    Stack RValueNames

*Fig. 2*

Class Statement

Public Methods:

virtual Initialize ()
    virtual Execute ()

Private Attributes:

NextStatementIndex
    NextStatementPointer
    others, as needed

*Fig. 3*

Storage subsystem input

Storage subsystem output

Class GUIProgram:subclass Program

Public Methods:

virtual Compile ()
    virtual Initialize ()
    virtual Execute ()

Private Attributes:

all attributes of class Program

Stack WindowList
    Stack TextBoxList
    Stack GUIObjectList
    Stack AnimationObjectList other similar objects

*Fig. 8*

COMPILER DESIGN USING OBJECT TECHNOLOGY WITH CROSS PLATFORM CAPABILITY

This application claims benefit of Provisional No. 60/067,827 filed Dec. 5, 1997.

TECHNICAL FIELD

This invention relates generally to programming languages and, more particularly, to macro languages and object oriented programming.

BACKGROUND OF THE INVENTION

The use of macro languages is increasingly common in software engineering. Many industrial control systems incorporate one or more such languages for the logical processing of sensory inputs and the setting of outputs. A built-in macro language can perform high level manipulations with relatively simple statements, because of the special assumptions underlying the environments in which they operate. The ultimate value of a macro language in a software product is that it affords the end-user the ability to tailor the product to specific needs that could not be foreseen directly by the designer. The benefits of this accrue both to the designer, who need not maintain myriad versions of the product, and to the end-user, who can obtain specialized benefits from the software without requesting a special development of the designer.

In software engineering, a macro language is simply a procedural language, with its own rules of syntax, in a structured environment. A language such as Java, commonly used for Internet "applets", could also be considered to be a macro language from this standpoint. What is common to virtually all of these situations is that, usually, the language is executed by an interpreter. That is, the program text is parsed at run time, and then, based on the branches taken by the parser, a so-called "interpreter engine" performs the specified logic. There can be advantages to an interpreted language. First, the complexity of the program is defined by the complexity of the parser. The interpreter engine can be written in a higher level language. Second, since text can be ported easily between computer platforms, an interpreted language program can be run without change, on any computer platform or operating system for which there exists an interpreter engine. The primary disadvantage to an interpreted language is slow execution. An alternative and more traditional approach is a so-called "compiled" language. In a compiled language, a pre-processor, called a compiler, parses the program text and produces a so-called "binary executable file" which consists of a sequence of machine language statements that can be executed directly by the CPU. That is, the binary executable file stands alone at execution time. It executes itself. The primary disadvantages of a compiled language are the opposite of the advantages of an interpreted language. First, the machine language syntax that should replace a parsed phrase can be extremely difficult to design. Second, the very nature of the binary executable file is to be computer platform and operating system dependent. The primary advantage of a compiled language over an interpreted one is speed of execution, often by at least an order of magnitude. This can be a critical factor for a procedure.

An intermediate alternative approach is to substitute integer codes (also called byte codes) for different statement types. In this case, a pre-processor performs the language syntax parsing task once and replaces text (or symbolic) statements with the coded versions. This approach requires that an execution "engine" read the integer codes and perform the required actions based on the actual code values. While this algorithm retains platform independence and is faster than an interpreted program, it is somewhat slower than a true compiled version, because of the number of cases that must be traversed during execution of the program.

SUMMARY OF THE INVENTION

In accordance with the invention, there is provided an object compiler and associated object execution engine. The object compiler is used to compile source code into persistent objects that can be stored as a machine and operating system-independent file and that can be read and executed by the object execution engine. The object compiler carries out the following steps. First, it parses the statements of source code and converts each statement into one or more pre-defined, persistent instruction objects, each of which has at least one virtual function associated therewith. Then, it orders the instruction objects to thereby generate a sequence of the instruction objects. Finally, the sequence of instruction objects are stored on non-volatile storage, such as a hard disk or other magnetic media. Ordering of the instruction objects can be accomplished by providing an index for each instruction object that is indicative of its position within the sequence, with the indices being stored along with, or as part of, the instruction objects. Preferably, the instruction objects each have a virtual initialize method, a virtual execute method, and an index indicative of the next instruction object in the sequence. Data used in the statements can be represented as persistent data objects, each of which has an index that is used to access the data when needed. The instruction objects and data objects can be stored in separate stacks (i.e., as linked lists), with their indices indicating their position within the stack.

The object execution engine executes the compiled instruction objects using the execute method of each instruction object. This execute method operates to execute at least one machine language instruction and to provide a return value that identifies another of the instruction objects. Thus, the object execution engine can execute a sequence of instruction objects by calling the execute method of each of the instruction objects and using the return value to access the next instruction object. For C++, the object execution engine could be written as:

```
Statement* next;
next = InstructionList [0];
while (TRUE) {
    next = next->Execute ();
}
```

The execute methods are provided as a part of a set of instruction object definitions that define each type of instruction object as a different class. These object definitions will typically be machine-dependent and can therefore be provided along with the object execution engine. Each instruction object definition can include a pointer, with the initialize method being used to assign the pointer to a dynamically allocated memory address that points to the instruction object identified by its index. Then, the return value provided by the execute method can be the pointer to the next instruction object.

This arrangement provides speed characteristics close to a true compiled version. The advantages of such an approach are design simplicity and operational speed, without compromising portability between platforms or operating systems. The object compiler abstracts many of the structural features of a binary executable, but at the same time incorporates higher level building blocks that embody the assumed environment of the particular language. Since the building blocks are all compiled using a true (optimized) binary compiler, the assemblage of them can execute with the speed of a compiled language, yet the data required to invoke the building blocks can be machine independent.

BRIEF DESCRIPTION OF THE DRAWINGS

A preferred exemplary embodiment of the present invention will hereinafter be described in conjunction with the appended drawings, wherein like designations denote like elements, and:

FIGS. 2 and 3 depict an overview of exemplary object definitions for some of the higher level objects used in the preferred embodiment of the invention; namely, the object definitions for class Program and class Statement, respectively;

FIG. 8 depicts portions of an object definition for use providing a graphical user interface language.

DETAILED DESCRIPTION OF THE PREFERRED EMBODIMENT

The preferred embodiment of the object compiler and object execution engine described herein are implemented as computer programs that are stored on non-volatile memory and that are operable to carry out the compiler and object execution methods described herein. These programs can be run on a general purpose computer, either standalone or networked. The platform independence of the compiled instruction objects makes the invention suitable for use in developing and distributing software over a global computer network such as the Internet. As the description proceeds, it will become apparent that the invention is also suitable for use in other environments, such as industrial controls and automation.

Figure 1:
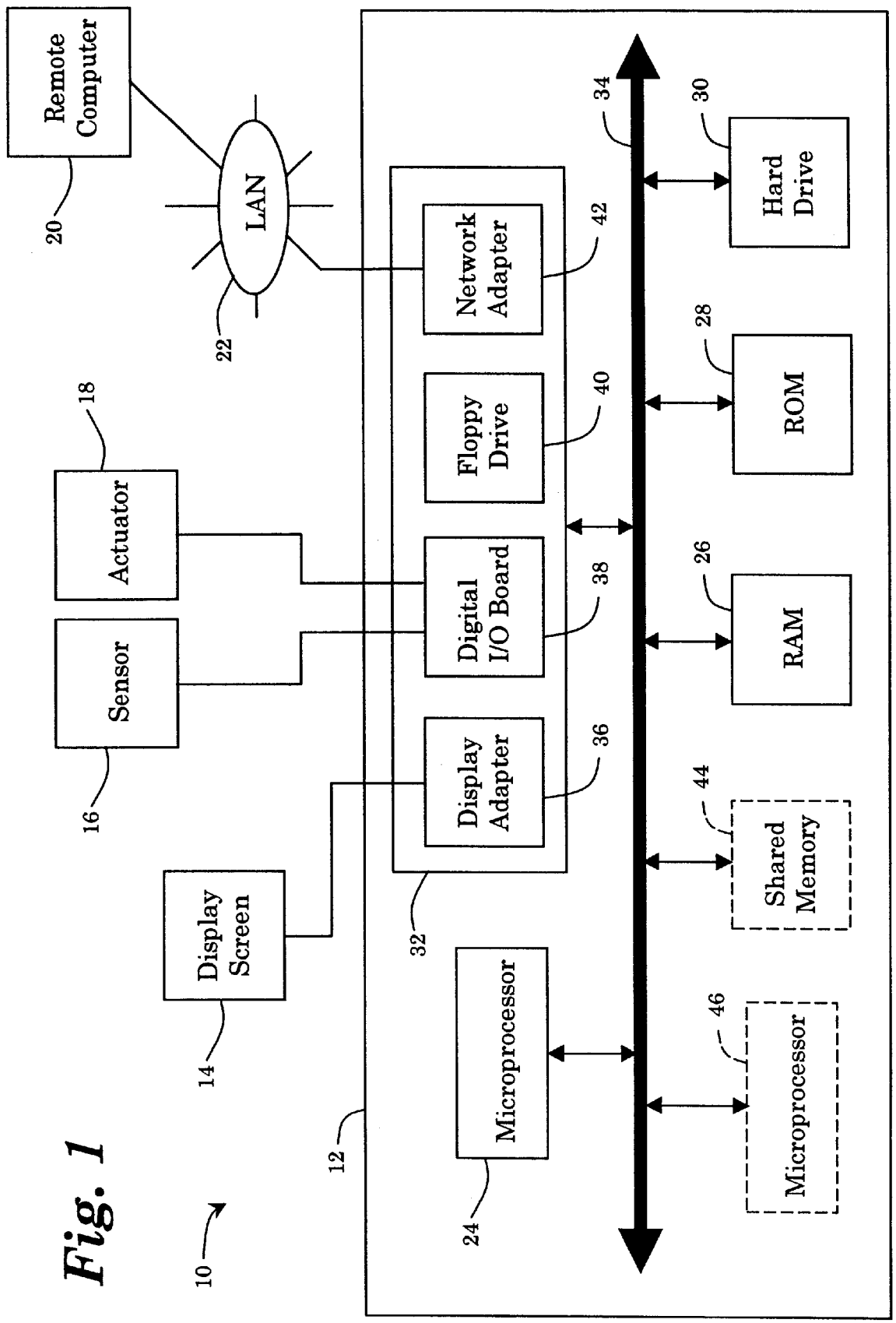
FIG. 1 is a block diagram of a computer environment suitable for implementing the invention.

Referring to FIG. 1, there is shown an exemplary computer system 10 suitable for use in executing instruction object code produced by the object compiler. Computer system 10 includes a computer 12, display screen 14, sensor 16, actuator 18, and, optionally, a remote computer 20 connected to computer 12 via a local area network 22. Computer system 10 can include additional I/O and other peripherals, such as a keyboard and serial input device. Computer 12 includes a microprocessor 24, RAM 26, ROM 28, hard drive 30, and I/O 32 all connected to a data bus 34. The I/O devices 32 include a display adapter 36 for controlling the display of information on screen 14, a digital I/O board 38 for interfacing with sensor 16 and actuator 18, a floppy disk drive 40, and a network adapter card 42 for connecting computer 12 to LAN 22. Other such I/O devices may be utilized; for example, a modem that permits connection to a remote network, such as the Internet. Each of these components and their interconnections can be implemented in a conventional manner. Computer 12 could also be utilized in an industrial environment with data bus 34 comprising, for example, a VMEbus, in which case computer 12 might also include a region of shared memory 44 as well as a second processor 46. As will e discussed in greater detail below, the preferred embodiment can be utilized in such an environment to provide a robust method for accessing the shared memory that obviates the need for a separate interlocking mechanism while avoiding the possibility of data corruption due to multi-tasking or multi-processor accesses. Moreover, because of the speed of accesses, shared memory can be advantageous even in a single processor environment, in which case the shared memory could be allocated dynamically at run time by the underlying operating system.

Compiler and Object Technology Background

The purpose of a compiler is to translate a high level description of a chain of logic into some form of executable module. The translation function, also called parsing, is built from a specification of the high level syntax. This syntax can be textual, as in all of the examples provided herein, or graphical, as in a flow chart language. The specific elements of the language and the format of the input to the parser are irrelevant to the underlying principles of compiler design, which entail that a sequence of instructions, involving actions on abstract storage objects, be converted into an executable format. All high level languages incorporate elements to be ignored by the parser, such as blanks, "end-of-line" characters, tabs and descriptive comments. These elements will not be considered to be statements. Rather, they are considered "blank space" that are ignored by the object compiler.

Object software terminology and concepts are commonly available and understood to those skilled in the art. Three attributes of object-oriented languages are particularly relevant to the present invention. They are the concepts of a class, a subclass, and a virtual function (also referred to as a virtual method).

Traditionally, organization of a software project has centered around the procedures that were needed to carry out the tasks required of the program. This, so-called "procedural" approach has been found to be difficult to extend and maintain, especially for large and complex projects. Recently, a new approach, called "object-oriented programming", has emerged. In an object-oriented code, the focus is centered on software constructs called "objects", which may consist of a heterogeneous collection of data of arbitrary complexity. The data describes the internal state of the object, and, in general, is not directly accessible outside of the scope of the class object. In order to access the state of an object, or to change the state of an object, from within a software module, that module must call a function subroutine, also called a method, associated with the class object. This process is also called "sending a message" to the class object. The data and methods associated with a particular (named) class is specified in a class definition. In effect, a class object represents an entity with an internal state and an interface to its external environment, in the form of a collection of subroutines. Such a software object can be useful for modeling real-world entities.

For example, in a software project intended for banking operations, a class called Account can be used to model the various kinds of accounts available to customers of the bank. As potential data items, class Account could incorporate the date the account was opened and the current balance. As potential methods, class Account could incorporate a so-called "accessor" function, which returns the current balance, a function for withdrawing a specified amount from the account and a function for depositing a specified amount into the account. Class Account could also incorporate a method for computing interest, but, since not all accounts are interest-bearing, such a function could prove problematical. This issue will be discussed further below.

There are several kinds of functions associated with a class definition. The "accessor" function used to access internal data has already been discussed above. Another type of function is called a "constructor", because it is used to initialize a class object, either from the standpoint of setting internal data from values passed by an external source, or from the standpoint of building the object's internal structure prior to use, or both. A third type of function is called a "destructor", because it is used to finalize a class object when it is being discarded. This function can be used to return dynamically allocated memory, for example, or to perform other operations needed to maintain the overall software project in a consistent state when the object is deleted. For example, an Account object, on deletion, must make a final disposition of any remaining balance, or the bank may find that it has lost electronic access to some of its money.

In a software project, each subroutine must have a unique "signature" to allow the linker to be able to assemble the correct modules into an executable program. In a procedural language, the signature consists of the subroutine name only. Therefore, no two subroutines can have the same name. In an object-oriented language, the signature consists of the name together with the associated class name and the type and order of variables in the calling sequence. Therefore, there can be many subroutines having the same name, but other attributes of the signature must differ. (The return types of all subroutines in a class with the same name must be the same.) The definition of multiple subroutines of the same name associated with a given class is called "function overloading".

The syntax for accessing a class function varies from language to language. Uniformly, however, the syntax requires that the software specify the following: the name of an object which has been declared to be of the class type; the name of the method; and the names of the variables in the calling sequence of the method. The name of the object can correspond either to the object itself, or, in some languages, to an address corresponding to the object. The latter is called a "pointer". Pointers are declared to be pointing to a specific type of data or class.

In the banking example, using the C++ language, this is done with a declaration:

Account acc; (1)

The current balance function, Balance( ), may be accessed via acc.Balance( );

If accPtr is a pointer to an object of type Account, then the claration and current balance statements change to Account* accPtr;

and accPtr->Balance( );

In the latter case, the pointer must be initialized to an actual address between the declaration and the use of the pointer. In C++, this is done with the "new" operator:

accPtr=new Account ( ); (2)

This statement calls the constructor for class Account with no variables in the calling sequence. Other constructor calls are possible, if declared in the class definition. The difference between statements (1) and (2) is that the former allocates storage statically, at compile time, and the latter allocates storage dynamically, at run time. Statements of type (2) will be discussed further below.

Class Account is too general to be of much use in a true banking application. Accordingly, it may be desirable to design new classes to represent the various specialized classes. However, these new classes should have the same external interface, and, ultimately, it would be useful to access different classes interchangeably without having to know the specific type. For example, the software should not have to be aware of the type of account class if what is required is to perform a deposit. Or, if it is required to add interest to an account, the software external to the class should not have to be aware of the rules for computing interest for a given account class. These requirements can be met by utilizing the object-oriented concepts of "subclass", or "inheritance", and "virtual functions".

A class object can be designated to be a subclass of a previously defined class, the parent class, in which case it "inherits" all of the data and subroutines of the parent class. This means that the data associated with the parent are also associated with the subclass, in addition to any new data specifically defined for the subclass. Similarly, the methods, or subroutines, associated with the parent are also associated with the subclass, in addition to any new methods specifically defined for the subclass. However, if the subclass specifically defines a method with the same signature as a method in the parent class, that method can override the parent version. Whether the subclass version actually does override the parent version depends on the syntax of the use of the class.

For example, assume that class SavingsAccount is declared as a subclass of class Account, and that a method ComputeInterest is declared in both Account and in SavingsAccount. If the class object acc is declared as in statement; (1), then acc.ComputeInterest ( );

calls the ComputeInterest method defined in class Account. However, if the class object acc is declared by SavingsAccount acc;

then acc.ComputeInterest ( );

calls the ComputeInterest method defined in class SavingsAccount.

Similarly, if the pointer accPtr is declared by

Account*accPtr; (3)

then accPtr->ComputeInterest ( );

calls the ComputeInterest method defined in class Account, even if accPtr is initialized to be of class SavingsAccount, as in accPtr=new SavingsAccount ( );

The object-oriented declaration concept that changes this rule for overriding methods is the so-called "virtual function". If a parent class declares a method to be virtual, then all subclasses retain that designation for that method. The virtual designation causes the final resolution of the signature of a method to be postponed until runtime.

For example, if the method ComputeInterest is declared in class Account to be a virtual method, then accPtr=new SavingsAccount ( );

causes accPtr->ComputeInterest ( );

to use the SavingsAccount version for ComputeInterest, while the initialization accPtr=new Account ( );

causes accPtr->ComputeInterest ( );

to use the Account version for ComputeInterest. Both of these cases assume that accPtr is declared as in statement (2). Thus, a virtual function is defined by the specific class of association, even when that association is not finalized until run time.

The last object-oriented concept detailed herein is called. "persistence". A class object is called persistent when it has the capability, through member functions, to be saved to non-volatile storage, and then restored, in its current state. For example, if acc is declared to be of class Account, and Account has declared (virtual) functions Restore and Save, then acc.Save (Out);     (4)

saves class object acc to the output medium Out, and acc.Restore (In);

restores class object acc from the input medium In. If accPtr is declared as in statement (2) and a "save" is performed using accPtr->Save (Out);     (5)

then, the exact nature of the "save" depends on how accPtr is initialized. If accPtr is initialized using accPtr=new Account ( );

then, statement (5) saves an object of type Account. On the other hand, if accPtr is initialized using accPtr=new SavingsAccount ( );

then statement (5) saves an object of type SavingsAccount. It would be useful be able to declare accPtr as in statement (2), and then to restore an account class from an input medium into the pointer accPtr (without a prior initialization). If what was previously saved was of type Account, the restore operation should be able to initialize accPtr to point to a class object of type Account, and then to restore the data associated with Account from the input medium. On the other hand, if what was previously saved was of type SavingsAccount, the restore operation should be able to initialize accPtr to point to a class object of type SavingsAccount, and then to restore the data associated with SavingsAccount from the input medium. In other words, it would be advantageous to be able to have the restore operation make a run time decision about the specific type of subclass of a given parent class that is being restored.

Such a capability requires the construction of what will be referred to herein as an "object factory", that can reconstruct the type identity of a particular subclass within an inheritance tree structure from stored data. This capability exists and is available commercially. For example, in C++, the Tools.h++ class library from Rogue Wave, Inc. of Corvallis, Oreg. provides this capability. Also, the Microsoft Foundation Class library provides this capability through the so-called "CArchive" class.

Modelling of an Executable Program

The object compiler generates from the source code a set of objects that together provide an object-oriented model of an executable program. Typically, an executable program consists of several parts. The primary part is a block of memory containing executable (binary-level) machine instructions. Different processors have different machine instruction formats, but each machine instruction, on execution, changes the state of the processor/memory combination, minimally by changing to the next executable instruction. Indeed, the next executable instruction may be the next instruction in the list, or instruction stack, or it may constitute a jump. Furthermore, other aspects of the underlying computer may be changed. Memory may be overwritten. An I/O port may be effected. Non-volatile storage may be modified. The screen, if any, may be modified. A second part, then, is a memory stack, where data is stored in various formats.

Minimally, then, the executable program consists of an instruction stack and a memory stack. Other elements can be added, as will be discussed subsequently. The executable program is modelled as a class, called Program, with attributes, to be specified, that mimic those of the prototype. Particularly, the Program incorporates several stacks, for instructions and memory, and so a software model of a stack will be included.

A stack can be defined to be a linked list that stores a sequence of class objects by address (i.e., by pointer), which has the "object factory" type of persistence. That is, if each object stored in the list is persistent, then the list is persistent, and, on restoring from non-volatile memory, the identities of the individual components is correctly determined. The stack should be ordered by insertion. That is, if objects are inserted in a given order, then that order should be maintained. The stack should support an "append" operation, whereby items are added to the end of the list. The stack should be able to return the index of an, item, given the item identity. That is, if the objects being added to the stack can be compared, based on some characteristic called an "identity", then the stack software must be able to return the index of the first item with a specified identity. Furthermore, a stack must support two additional operations. It must be capable of indexing and iterating. The first property refers to the ability to return the address of the $i^{th}$ object, given an integer index i. The second property refers to the ability to start at the first object in the stack and to successively access each of the succeeding objects, until reaching the end. Such a persistent stack can be implemented as a class object, (called Stack). There are a number of commercial class libraries with various compatible implementations. For example, the tools.h++ library identified above.

In terms of Stack, a simple program class can be defined. As shown in FIG. 2, class Program must have, as (non-public) data, two stacks:

Stack InstructionList;

and

Stack MemoryList;

The next step in the software model is to define the class objects that can be placed into the InstructionList stack. Since these objects correspond to the real-world executable statements, a new persistent class called Statement can be defined.

As shown in FIG. 3, class Statement is declared to have at least two methods, both of them virtual so that subclasses of Statement can override them. These are virtual Statement*Execute ( );           (6)

and virtual void Initialize (Program*);       (7)

The Execute method returns the address of (pointer to) the next executable statement (i.e., instruction object) in the InstructionList stack. The Initialize method requires, as an input argument, a pointer to the parent Program object. This is needed so that, on initialization, each Statement object can have access to resources stored within the Program that are needed for set up. Each subclass of class Statement has, as member data, an integer index into the InstructionList stack and a pointer to an object of class Statement. This index gives the location of the next executable statement. On initialization, the Statement pointer is set equal to the InstructionList item indicated by the previously stored index.

Figure 4:
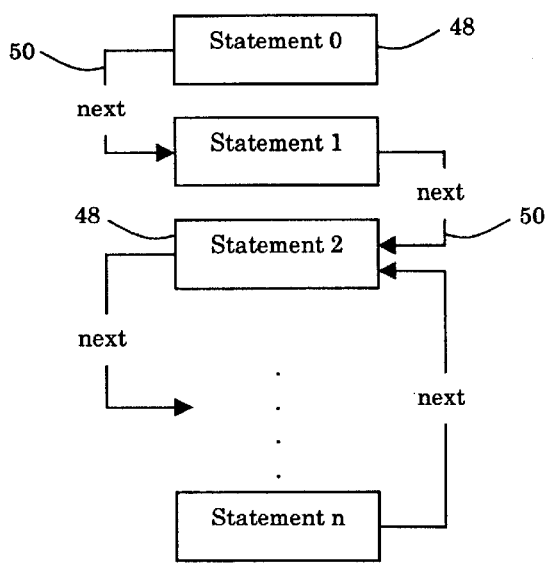
FIG. 4 is a diagram showing the structure of an exemplary Instruction Stack produced by a preferred embodiment of the object compiler of the invention.

With the methods listed in statements (6) and (7), a Program can be initialized after loading by iterating through the InstructionList stack, from beginning to end, and calling each Statement's Initialize method. The result would look like that shown in FIG. 4, with each statement 48 having a pointer 50 that points to the next statement in the sequence.

Figure 5:
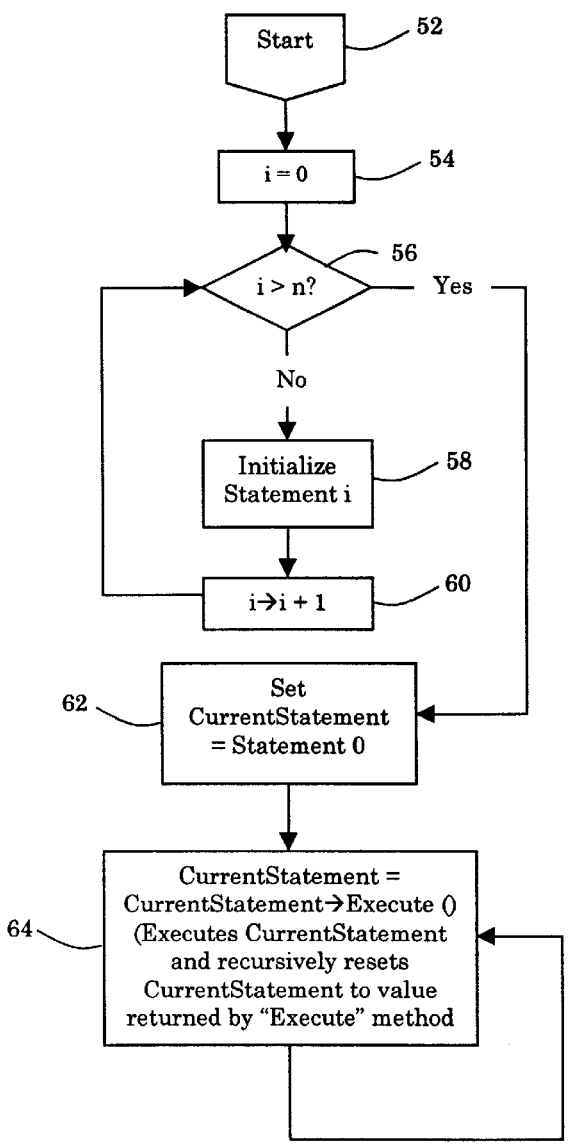
FIG. 5 is a flow chart depicting the basic method utilized by a preferred embodiment of the object execution engine of the invention.

A Program can then be executed by calling the first Statement's Execute method, and using the return value it to determine the next Statement to be executed. This object execution engine procedure is shown in FIG. 5. The process begins at start block 52, with the first step being to set an instruction counter i equal to zero, as indicated at block 54. The next step, block 56, is the beginning of the initialization loop where a check is made to determine if the instruction counter i is greater than the total number n of instruction objects. If not, the process moves to block 58 where the Initialize method of Statement i is executed. Then, at block 60, the instruction counter i is incremented and process flow returns to block 56. Once all of the statements have been initialized, as represented by i=n+1, the process will move from block 56 to block 62, where the CurrentStatement will be set to the first statement (i.e., Statement 0). Then, at block 64, the statements are sequentially executed by performing the Execute method of each statement. As mentioned above, in addition to performing its particular instructions, the Execute method for each statement returns a pointer to the next statement. Thus, the sequential execution of the statements in stack InstructionList is accomplished simply by having block 64 loop back to itself, each time executing the next instruction identified by the pointer returned during the previous loop. This looping continues until all statements have been executed.

In C++, the execution code for blocks 62 and 64 would be:

```
Statement* next;
next = InstructionList [0];
while (TRUE) {
    next = next->Execute ();
    // other statements optional
}
```

Each Statement in the Stack will have its own, specialized Execute method, and therefore, the function of the overall Program will depend on the exact order and identity of the Statement's in InstructionList. It will be the function of the compiler method to parse a text (or graphic) mode file and to derive a particular sequence of Statement objects that it will append to the InstructionList.

Frequently, executable statements access storage. For this, a new persistent class called Storage can be defined. However, to avoid complicating the interface by explicitly accounting for all of the built-in data formats, a generic persistent data format class called class Data can be defined. Class Data can have subclasses of type Integer, Unsigned, and Double, for example, so that any of the standard data formats can be passed or returned between methods as a Data object. With further refinement, arrays and other non-scalar types can be incorporated as Data objects.

Class Storage is declared to have a number of methods, all of them virtual so that subclasses of Storage can override them. Class Storage requires an initialization method, and methods to read data and to write it. Depending on the types of data to be supported, there can be quite a few read and write methods. The initialization method has the format virtual imt Initialize (Program*);

which, for the same reasons as the initialization method for class Statement, requires access to the underlying Program object for set up. The return value is an integer, which allows for an error return to indicate that set up was not successful. Read and write access functions have the format virtual void SetValue (mint Value);

which sets a Storage object to have value equal to the argument Value, and virtual int GetIntegerValue ( );

which returns the integer representation of the current value of the Storage object. Other numeric data representations are similar. Class Storage can incorporate a member data object of class Data, which will retain the current state of the Storage object.

Class Storage, itself, represents the interface to a general classification. In a software application, there can be many types of data. Referring momentarily back to FIG. 1, there can be data that is local to program, or sensory data available from an input board or from the screen, or actuator data that is routed out to an output board or to the screen. There can be data held in shared memory and accessed by other processes on the same computer. There can be data that is routed to another computer over a local area network. There can be constants that are used within the program. These are just a few of the possibilities. Each type of data can be modeled as a subclass of class Storage. Several examples are described below.

Class LocalStorage is defined to be a subclass of Storage. The implementation of LocalStorage::SetValue (int Value)

is to change the Data object within the LocalStorage object to take on the integer Value. The implementation of LocalStorage::GetIntegerValue ( )

is to return the integer value corresponding to the current state of the internal Data object. In other words, the current value of the LocalStorage object is entirely dependent on the current stored value in its internal Data object. This corresponds to the standard interpretation of "storage" in an executable program.

Class SensorStorage is defined to be a subclass of Storage. The implementation of SensorStorage::SetValue (int Value)

is to make no change, since sensors should be read-only. The implementation of

SensorStorage::GetIntegerValue ( )

depends on the process required to read a sensor. Minimally, however, it requires the underlying software to read the latest value of the sensor into the internal Data object, and then to return the integer value corresponding to that object. SensorStorage could retrieve its actual data from local shared memory, or, via message, from a remote computer. In effect, SensorStorage can act like a read-only remote procedure call.

Class ActuatorStorage is defined to be a subclass of Storage. The implementation of ActuatorStorage::SetValue (int Value)

depends on the process required to set an actuator. Minimally, however, it requires setting the internal Data object to take on the integer Value, followed by a message to an actual actuator process. The message could set one or more bits on a digital output card, or it could send a message to a process with its own protocols for setting an output.

The purpose of these examples is to show that the Storage class is capable of encapsulating complex storage behavior with a straightforward interface. The details of the various implementations depend on the application domain of the macro language itself, and are within the capabilities of a person skilled in the art.

To provide the compiler with the safety of what is called "strict typing", wherein a syntax can only be used for its intended purpose, several more stacks can be added to class Program. The Memory stack is used for LocalStorage objects. If there are any other types of Storage objects, they are added to Stack RValueList;

or

Stack LValueList;

The RValueList stack is a list of non-local storage objects that appear to the "right" (or independent variable side) of the equal sign in an expression. That is, RValues are sensors, or, read-only. The LValueList stack is a list of non-local storage objects that appear to the "left" (or dependent variable side) of the equal sign in an expression. That is, LValues are actuators. The following three stacks are also added to class Program:

Stack MemoryNames;

Stack RValueNames;

and

Stack LValueNames;

in which are stored character strings that are the names of the LocalStorage objects, RValue objects and LValue objects, respectively. These stacks are needed for the parsing and compiling operations.

Parsing Expression Statements

To see how the object compiler works, the following discussion details the process for a simple expression, in which a variable, called A (either a local variable or an actuator), is to be set equal to the sum of two other variables, called B and C. Depending on the language syntax, this might be expressed as $$A=B+C; \tag{8}$$

The parser would find the "equal" sign and then identify a syntax of the form "A ='expression'". There are many ways to parse and compile expressions like "B+C". The simplest is to define a subclass of Statement, called "AddStatement", the function of which is to add two variables that are previously moved to predefined storage locations. While this approach works, it is much less efficient than defining a persistent Expression class, which can be "evaluated". There are many different ways of defining the evaluation method (s) for class Expression, depending on the manner in which the different data formats are incorporated into the macro language syntax. Class Expression could have an initialization which determines the format-integer, decimal, unsigned, etc.—of the result, and then there could be a separate evaluation method for each type. Another way is to return an object of class Data from a single method, so that the format will be handled automatically by the assignment syntax of class Data. A third way is to call the evaluation method with pointers to each of the supported formats as arguments in the calling sequence. In this case, the evaluation method sets only one of them, and then, based on the return value from an initialization method, the calling program uses that value as the result of the evaluation. This last is the fastest to execute. However, since the fundamental ideas of this section do not depend on the detailed manner in which Expression methods function, the evaluation method will be explained using the second option. Thus, class Expression will be defined to have a virtual method:

$$\text{virtual Data Evaluate ( );} \tag{9}$$

Before continuing with the Expression class, consideration should be given to how a parser would deal with the variables in formula (8). Proceeding left-to-right, the parser would find each of the variable names 'A', 'B' and 'C', in turn. First, the parser would check if A is previously defined to be a local variable. If so, it would find the index in the MemoryNames stack, and then the corresponding Storage pointer (say, APtr) in the Memory stack. If A already appears in the LValueNames stack, then the index, AIndex, of that entry is saved. If A is not already in the LValueNames stack, then the name "A" is added and the pointer, APtr, is added to the LValueList stack If A is not a local variable, then, if not already in the LValueNames stack, the name "A" is added to the LValueNames stack and a new object of the appropriate Storage type is created, and added to the LValueList. Using the examples above, this Storage type might be ActuatorStorage. The variables B and C are handled similarly, except that, instead of searching the LValueNames stack, the RValueNames stack is checked, and, instead of modifying the LValueList, the RValueList is appended. The final result is, however, that indices AIndex, BIndex and CIndex are computed, the first into the LValueList stack and the last two into the RValueList stack. AIndex gives the index of the Storage object that can set the variable A, and BIndex and CIndex give the indices of the Storage objects that can retrieve the values of the variables B and C.

For the purposes of this example, three additional subclasses of Expression should be defined. The first subclass is class DataExpression, which retains, as member data, the integer index of a storage object to be evaluated, and a pointer to an object of class Storage. On initialization, the DataExpression class object sets its Storage pointer to the RValueList item indicated by its previously stored index. The DataExpression version of the function (9) will get data (in the appropriate format) from its Storage object, and then return it as a Data object. The second subclass of Expression is class BinaryExpression, which has as member data two pointers to objects of class Expression. On initialization, the BinaryExpression class object initializes both of its Expression objects. The third is a subclass of class BinaryExpression called class AddExpression. The AddExpression version of the function (9) will evaluate each of its member Expression objects and then return a Data object with value equal to the sum of the two evaluations.

The parsing algorithm will form a new DataExpression, called BExpression, based on BIndex and another new DataExpression, called CExpression, based on CIndex. Then, a new AddExpression, called Answer, will be created based on the two expressions BExpression and CExpression. As a result, there then exists an Expression object that can retrieve the current values of B and C and calculate their sum.

The next step is to define a subclass of class Statement called Assign. Class Assign has as member data an integer index into the LValueList stack, a pointer to an object of type Storage and a pointer to an object of class Expression. At this point, the parser can create a new Statement object of type Assign based on the index AIndex and the Expression object Answer. The InstructionList index for the next executable statement is set to the index of the current statement plus one, that is, the next instruction in the stack. On initialization, the Assign class object sets its Storage pointer to the LValueList item indicated by its previously stored index, and initializes its Expression object. Furthermore, the Statement pointer to the next executable statement in InstructionList is obtained from the appropriate index. The method Statement*Assign::Execute ( );

is defined so that the expression Answer is evaluated and the Storage object within the Assign class is set from the return value. In this way, the same statement can implement complex actuation options, depending only on the various types of Storage subclasses are available. It should be clear how arbitrarily complex mathematical expressions can be parsed and compiled using this approach.

Design of the Storage Subsystem

The Storage subclasses define the data access capabilities of the macro language. In most compiled languages, basic data storage is accomplished by accessing a memory location that is local to the executing program. Most operating systems allow the creation of memory regions, called "shared memory", that can be accessed equally by more than one concurrently executing processes on a given computer. Once it is set up, the shared memory is still accessed as local memory, but further software is required to prevent data corruption due to simultaneous access. If local memory is all that is required in the Storage subclasses, then the class LocalStorage, described above, is adequate. This class stores data locally, as in a true memory location, but, in addition, it retains "type" information, such as "integer" or "double", and performs the required data conversions on input or output.

The Storage subsystem becomes more complex in case data may originate from a variety of sources, such as screen input, (hardware) board input or from the Storage subsystem resident on a remote, networked computer. One possibility would be to create a Storage subclass for each of these alternatives. In that case, there would be a Storage subclass for screen input and one for screen output. Similarly, each type of hardware I/O board would have its own subclasses, one for input and one for output. It is clear that this would represent a complex proliferation of classes. Further, the macro compiler would have to be aware, at compile time, what type of input or output should be assigned to each variable name. Later, if a variable name became associated with a different type of I/O interface, each program in which that variable name appeared would have to be recompiled. Ideally, the compiled program and the compilation process should be decoupled from the details of I/O interface for the Storage subsystem.

Figure 6:
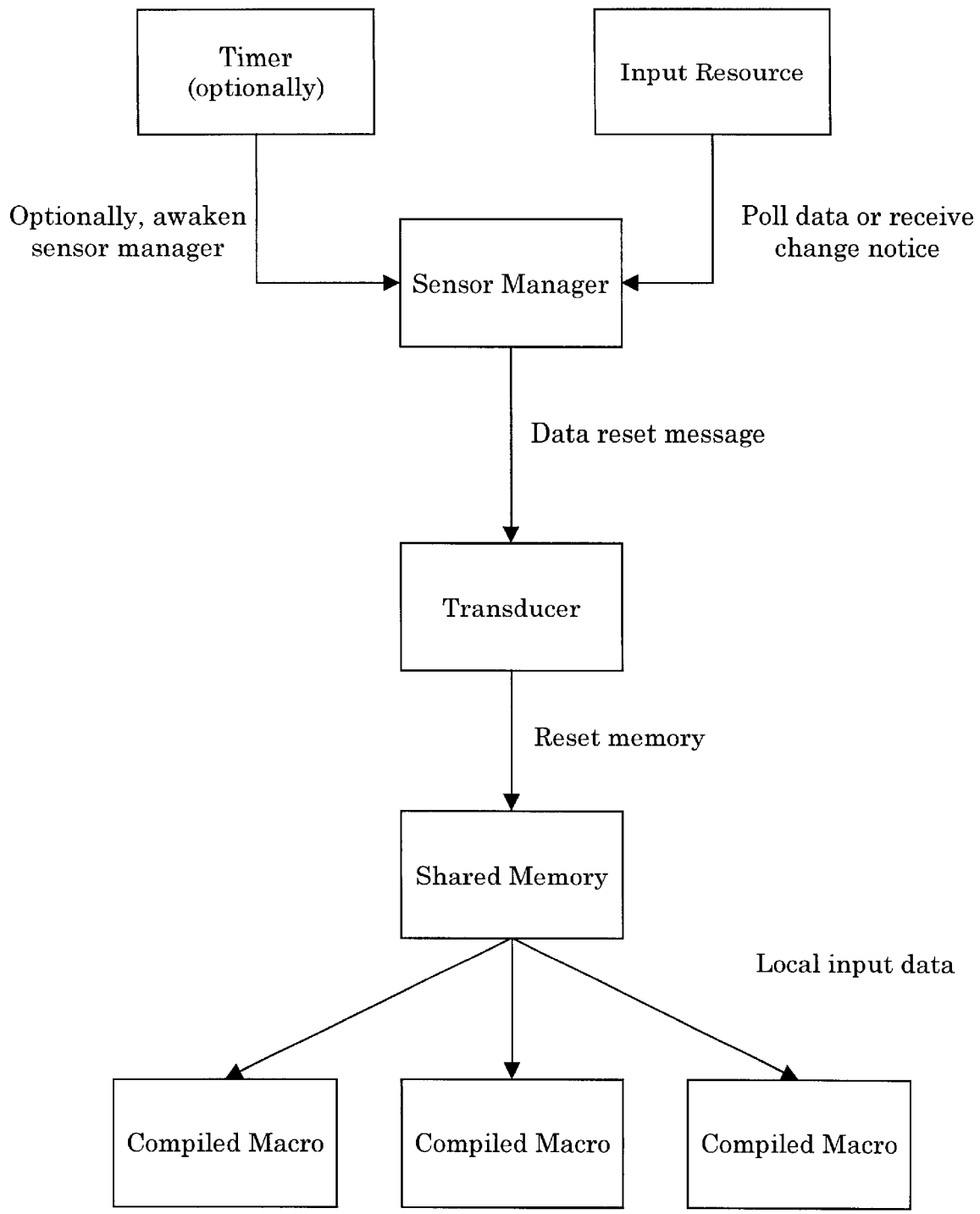
FIG. 6 is a diagrammatic representation of the storage subsystem of the object execution engine showing how it would be utilized for input.
Figure 7:
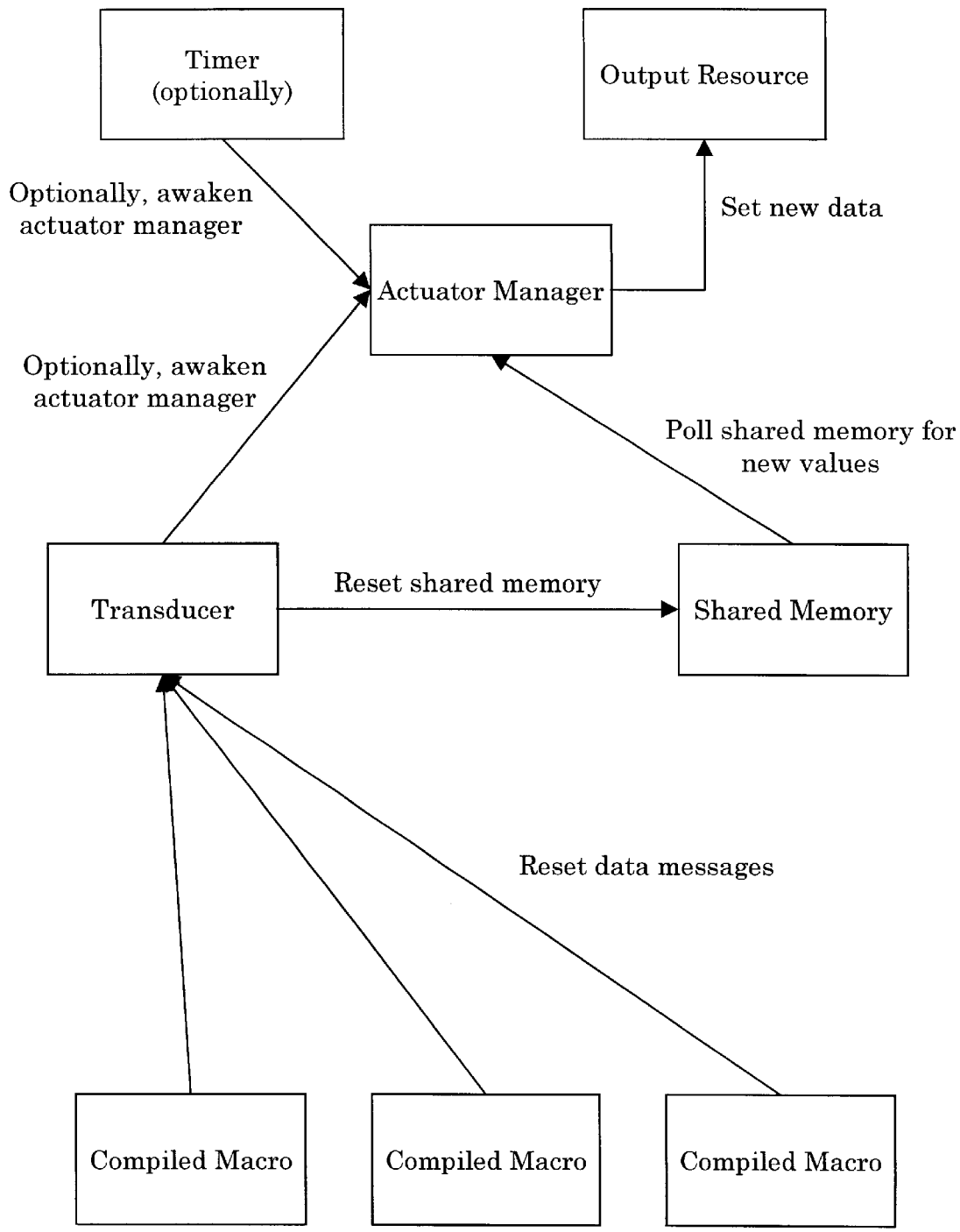
FIG. 7 is a diagrammatic representation as in FIG. 6 showing how the storage subsystem would be utilized for output.

With reference now to FIGS. 6 and 7, this can be accomplished with the addition of a data server process, called the "transducer" process, that runs on each networked computer that can source or receive data. Its job is to create a named shared memory region for each named data variable that is not purely a local variable within a macro program. Only the transducer can write to these shared memory locations. Any other process can read from them. By designating one writer and, potentially, many readers, the shared memory regions can be maintained without data corruption, and without special (and time-consuming) interlocking mechanisms managed by the underlying operating system. The absence of such protection also eliminates the possibility of race conditions. The structure of the shared memory regions will be further discussed below.

In addition to managing the shared memory regions, the transducer process accepts messages that request that one or more data variables assume new values. Finally, the transducer process accepts messages that request the current values of named data variables.

Thus, the implementation of SensorStorage subclasses is as follows. There must be two subclasses of SensorStorage, namely LocalSensorStorage and RemoteSensorStorage. LocalSensorStorage retrieves data by connecting to and accessing local shared memory. Thus, LocalSensorStorage becomes a generalization of LocalStorage which relies on the transducer process to manage the actual data values resident in the shared memory. RemoteSensorStorage retrieves data by sending a data request message to the transducer on the computer for which the data variable is local. That computer can be designated within the macro program in a number of ways, including direct declaration or a variable naming convention that specifies the "name" of the computer.

Similarly, the ActuatorStorage subclasses include LocalActuatorStorage and RemoteActuatorStorage. LocalActuatorStorage resets data by sending a data-reset message to the local transducer process, requesting that the named data variable be changed. A further subclass, CachedLocalActuatorStorage, could cause the data to be accumulated with other reset data and sent in one message, for greater efficiency than is possible with a single message per data variable. RemoteActuatorStorage resets data in the same manner as LocalActuatorStorage, except that its message is sent to a transducer process on a different computer. Identifying that computer can be accomplished in the same way as with remote sensors, described above.

This shows how the compiled macros interact with the transducer processes to place actuator data into shared memory regions and to retrieve sensor data from shared memory regions. However, it does not show how actuator data is transmitted between these shared memory regions and various input/output ports. The key to this step is the creation of what is referred to herein as sensor manager and actuator manager processes. Each such process monitors a designated list of data variable names, which are, in turn, managed locally by the transducer process. Each sensor manager, for example, then differs from the other sensor managers because of the actual sensor resources it manages. A screen sensor manager is designed to receive inputs from a graphic user interface. A digital input sensor manager is designed to receive inputs from a hardware digital input board. Similarly, each actuator manager differs from the other actuator managers because of the actual actuator resources it manages. A screen actuator manager is designed to send outputs to a graphical user interface. A digital output actuator manager is designed to send outputs to a hardware digital output board. There can be other functional differences between various I/O managers, in particular with respect to the timing by which a sensor or actuator manager refreshes its data. A manager can either poll its data at a designated and regular update frequency or it can respond only when prompted by a data change. For example, a screen sensor manager might respond only when awakened by a user-level screen input, at which time it would receive the new data and then send a message to the transducer process to reset the associated shared memory region(s). On the other hand, a digital input sensor manager might be configured to poll its input board every 50 ms., at which time the manager would read all of the inputs on the input board and then send a message to the transducer process to reset the associated shared memory region(s). Similarly, a digital output actuator manager might be configured to be awakened by the local transducer process whenever one or more of its data variable names is changed, at which time the manager reads all of its data shared memory regions and resets the bits on the output board. On the other hand, a screen actuator manager might be configured to awaken every 50 ms., at which time it would read all of its data shared memory regions and reset the appropriate graphic objects.

Thus, the compiled macros manipulate sensor and actuator data without knowing, or having to know, the type of sensors and actuators represented. Similarly, the transducer process manages the distribution of the data through messaging and shared memory, also without knowing, or having to know, the type of sensors and actuators represented. Finally, the sensor managers and actuator managers, in communication with the transducer process, actually manage the interface between the internal, shared memory, data representation and the external, tangible data manifestations.

One of the advantages of this overall approach is the true data independence afforded the compiled macros. Therefore, the logic structure of the compiled programs is maintained independent of the types of the input and output data. If sensor managers and actuator managers are designed to permit simulated operation, then they will function without the need for hardware present. A simulated I/O manager could merely maintain its data internally, in shared memory, with no actual input or output. With this capability, the program logic could be tested in a safe, virtual environment, without having to debug hardware, and then, when it is ready, simulation mode could be turned off with reasonable expectation that the program logic will perform as previously tested.

While these methods have been described as they would be used for manipulating scalar quantities, there is no intrinsic limitation, and multi-dimensional data formats can be accommodated easily within the same framework.

The Design of the Shared Memory Regions

The input/output manager structure described above depends on certain capabilities to be implemented within a shared memory framework. The goal of the design of the shared memory regions is to allow reading and writing without high level, time-consuming interlocking mechanisms that could cause race conditions between high and low priority tasks. Nevertheless, the shared memory design should prevent possible data corruption, even in symmetric multiprocessor systems. This can be accomplished if the shared memory has an access point that can be read or written in an atomic operation. For the purpose of the following description, it is assumed that the data associated with a particular shared memory region is fixed in size. Thus, the data could consist of an integer, a double precision variable or a fixed size array of some elemental data type, for example.

The structure of the shared memory region is similar to a circular queue. It consists of four integers plus a raw data region. Assume N is the length of the data to be stored in the shared memory. Thus, for example, N is the length (in bytes) of the array times the size of the elemental data type, in the case where the data is a fixed size array. Then, the shared memory region is designed to hold a number of copies of the data of length N, say M copies. In this case, the raw data region is of size MN. The first integer in the region is M, the number of copies. The second integer is an index, telling which of the M copies is currently active. The third integer is the dimension L of the array of data and the fourth integer is the size of the elemental data type, say P. Then, N=LP. If the size of the elemental data type is fixed for all variables (P=1, for instance), then the fourth integer is unnecessary, and only three are needed.

With this structure, reading and writing data is straightforward. Reading involves reading the index and then the data, while writing involves writing the data and then the index.

Specifically, to read the current value, a "reader" process must first read the index, in the second integer. This is an atomic operation. Given the index E, the reader now transfers N bytes data from a region beginning at the start of the raw data region plus the index, scaled by the dimension N, i.e., plus EN.

A "writer" process changes the current value as follows. Using the transducer structure discussed above, there is only one writer process, and therefore that the process knows the current index value, since it was the last to write it. The writer internally, and without yet modifying the shared memory, increments the index. If the incremented index is too large, it is reset to 0. With this new, internal index, the writer transfers N bytes of data into the region beginning at the start of the raw data region plus the internal index I, scaled by the dimension N, i.e., plus IN. When the data transfer is complete, then the index at the second integer of the shared memory region is changed to I. Since the new data will not be accessed until after the index is reset to I, and since this is an atomic operation, the shared memory region will not be corrupted, even in multiprocessor situations.

Compiling Simple Transfer Statements

Macro languages often incorporate transfer statements, in which the next executable statement is not necessarily the next instruction in the list. These statements can be either conditional or unconditional. An unconditional transfer statement causes the directed transfer on execution, no matter what local conditions exist. A conditional transfer statement only executes the transfer if a certain condition, evaluated within the statement, holds true. To incorporate transfer statements to named statements, the Program class must be augmented to include additional stacks to store all statement labels, all statement labels referenced within transfer statements, the indices of all transfer statements within InstructionList, and the indices of all labeled statements within InstructionList. With this data, at the end of the first pass of parsing, a second pass enables all transfer statements to be reset to the correct "next statement" index. When a transfer statement is initialized, prior to execution, the correct InstructionList statement will be retrieved as the next executable statement for the return value of the transfer function's version of statement (6).

Conditional transfer statements include, for example, "if" statements and "while" statements. An "if" statement incorporates a statement that is to be evaluated at run-time. It is followed by one or more statements that are to be executed if the expression is found to be "true". These statements are to be skipped if the expression is found to be "false". The indices of the first following statement and the first skipped statement are stored at compile time. During initialization, these indices are used to find the corresponding InstructionList statements which will be used for the (conditional) return values for the "ifs" version of statement (6).

A "while" statement also incorporates a statement that is to be evaluated at run-time. It is also followed by one or more statements that are to be executed if the expression is found to be "true". These statements are to be skipped if the expression is found to be "false". Unlike the "if" statement, however, the last statement in the sequence of "true" statements is taken implicitly to be an unconditional transfer back to the original "while" statement, so that the designated sequence is caused to loop repetitively until the expression evaluates to "false". As with the "if" statement, the indices of the first following statement and the first skipped statement are stored at compile time. However, in addition, an unconditional transfer statement is inserted just after the last of the sequence of "true" statements. As with the "if" statement, during initialization, the indices stored at compile time are used to find the corresponding InstructionList statements which will be used for the (conditional) return values for the "while's" version of function (6).

Platform Independence and Efficiency of Compiled Code

All persistent class data is based on built-in types, primarily integers. These are used for the indices into various lists. Therefore, when an object of class Program is saved onto non-volatile storage, it is the indices, not the pointers, that are saved. Thus, if the various classes, such as Statement and its subclasses, Expression and its subclasses, etc., are written to be "endian" aware, a Program class object can be compiled on one computer family and transferred and executed on any other for which all of the underlying class libraries have been compiled. Furthermore, since all table lookup is performed during initialization and the resolution of the myriad virtual function tables is performed using pointer arithmetic, execution is quite efficient.

Finally, storage of the indices that characterize various class objects represents a concise usage of non-volatile memory, since the code that actually executes is part of the overall executable, and is reused in place rather than replicated. That is, in a true executable program, every time a summation expression occurs, the binary code corresponding to that expression must appear in place. In the object compiler, only the indices for the variables are repeated. The underlying code is not.

Other Examples of High Level Language Constructs

The high level language syntax examples described thus far are primarily arithmetic. However, other language constructs are possible. For example, a graphic user interface language could include additional syntax to define graphic objects. A text object could be declared using text TextName;

and then that object could be hidden or displayed with one of hide TextName;

or display TextName;

Similarly, a window or button object could be declared using window WindowName;

or button ButtonName;

As above, these objects could be displayed or hidden using similar syntax to the text case. In the case of text, a further instruction could allow the text object to display a specific line of text, say "Hello, world!", or to be cleared, using display TextName ("Hello, world!");

or clear TextName;

FIG. 8 provides an exemplary class called class GUIProgram that depicts additional types of objects that might be utilized in the graphical user interface language.

Another language example might be intended for simulation of assembly operations. In this case, the objects of storage could be subassemblies of a final manufactured good, and the operations could include assembly and transportation. The "+" operator between subassemblies could be compiled to mean that the subassemblies are combined to form a new and larger subassembly. The compiled code would adjust the inventories of all affected subassemblies accordingly. This approach would correspond to an inventory-centric approach to the simulation. A process-centric approach could specify the objects of storage to be the manufacturing centers themselves, plus the transportation modes. In this case, the operations on the objects at any given time specify what raw materials arrive at each center, what action each center takes, and then what material leaves.

While the methods described herein have been discussed from the standpoint of the C++ language, it will be understood that these methods can be implemented in any object-oriented language. Also, it will be appreciated by those skilled in the art that any algorithm which is possible in an object-oriented language, is also possible in a non-object language. However, in such a case, the basic constructs of the object approach must be emulated, and so the non-object implementation becomes merely a more complicated version of the object approach. Also, while the examples discussed herein deal primarily with arithmetic and branching instructions, it will be apparent to those skilled in the art that other, perhaps more abstract language implementations are possible using the same underlying compiler technology.

It will thus be apparent that there has been provided in accordance with the present invention an object compiler and object execution method and apparatus which achieves the aims and advantages specified herein. It will of course be understood that the foregoing description is of a preferred exemplary embodiment of the invention and that the invention is not limited to the specific embodiment shown. Various changes and modifications will become apparent to those skilled in the art and all such variations and modifications are intended to come within the scope of the appended claims.

I claim:

1. A method of compiling source code into objects for subsequent execution using an object execution engine, comprising:

parsing statements of a computer program's source code;

converting each of the parsed statements into one or more pre-defined, persistent instruction objects, each of which has at least one virtual function that permits the instruction object to be executed by the object execution engine so as to carry out one or more machine language instructions;

ordering the instruction objects to thereby generate a sequence of the instruction objects; and storing the instruction objects on non-volatile storage.

2. The method of claim 1, further comprising the steps of:

determining an index for each instruction object indicative of its position within the sequence; and storing the instruction indices on the non-volatile storage.

3. The method of claim 1, wherein said converting step further comprises converting each of the parsed statements into one or more pre-defined instruction objects having a virtual initialize method, a virtual execute method, and an index indicative of the next instruction object in the sequence.

4. The method of claim 1, further comprising the step of representing data used in said statements as persistent data objects, each of which has an index associated therewith, wherein data used by said instruction objects is accessed using the indices associated with the data.

5. The method of claim 4, wherein said persistent data objects include arithmetic data objects.

6. The method of claim 4, wherein said persistent data objects include window data objects.

7. The method of claim 4, wherein said persistent data objects include graphical user interface data objects.

8. The method of claim 4, wherein said persistent data objects include process simulation data objects.

9. A digital storage device for use in executing a sequence of instruction objects, comprising:

a non-volatile digital storage medium;

an object execution engine stored on said digital storage medium; and a plurality of instruction object definitions stored on said digital storage medium, each of said instruction object definitions defining a separate class of instruction objects having at least one execute method, said execute method being operable to execute at least one machine language instruction associated therewith and to provide a return value that identifies another of said instruction objects;

wherein said object execution engine is operable to execute a sequence of said instruction objects by sequentially calling the execute method of each of the instruction objections contained in the sequence, with the object execution engine further being operable to use the return value received for each instruction object to select the next instruction object in the sequence for execution.

10. The digital storage device of claim 9, wherein each of said execute methods are virtual methods.

11. The digital storage device of claim 9, wherein each of said instruction object definitions includes an index that identifies the next instruction object in the sequence.

12. The digital storage device of claim 11, wherein each of said instruction object definitions includes an initialize method.

13. The digital storage device of claim 12, wherein each of said instruction object definitions includes a pointer and wherein said initialize method is operable to assign to said pointer a dynamically allocated memory address that points to the instruction object identified by said index.

14. The digital storage device of claim 9, wherein said return value comprises the instruction object's pointer.

15. The digital storage device of claim 14, wherein said object execution engine comprises a loop control structure and wherein said object execution engine is operable during each iteration of said loop to call the execute method of an instruction object identified by the pointer returned by the execute method called during the previous iteration.

* * * * *